US010532697B2

(12) United States Patent
Rakshit et al.

(10) Patent No.: US 10,532,697 B2
(45) Date of Patent: Jan. 14, 2020

(54) AUGMENTED REALITY-BASED ROADSIDE CONTENT VIEWING WITHIN PRIMARY FIELD OF VIEW

(71) Applicant: INTERNATIONAL BUSINESS MACHINES CORPORATION, Armonk, NY (US)

(72) Inventors: Sarbajit K. Rakshit, Kolkata (IN); Martin G. Keen, Cary, NC (US); James E. Bostick, Cedar Park, TX (US); John M. Ganci, Jr., Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/008,574

(22) Filed: Jun. 14, 2018

(65) Prior Publication Data

US 2019/0381937 A1    Dec. 19, 2019

(51) Int. Cl.
*B60R 1/00* (2006.01)
*B60R 11/04* (2006.01)
(Continued)

(52) U.S. Cl.
CPC .............. *B60R 1/001* (2013.01); *B60R 11/04* (2013.01); *B60W 30/095* (2013.01); *G02B 27/01* (2013.01); *G06K 9/00671* (2013.01); *G06K 9/00791* (2013.01); *G06T 19/006* (2013.01); *B60R 2300/205* (2013.01); *B60R 2300/308* (2013.01); *B60R 2300/8026* (2013.01); *B60R 2300/8093* (2013.01)

(58) Field of Classification Search
CPC ............ B60R 1/001; B60R 2300/8026; B60R 2300/308; B60R 2300/205; B60R 2300/8093; G02B 27/01; G06T 19/006; G06K 9/00791; G06K 9/00671
See application file for complete search history.

(56) References Cited

U.S. PATENT DOCUMENTS 7,561,966 B2    7/2009    Nakamura et al.
8,947,219 B2    2/2015    Popovic
(Continued)

OTHER PUBLICATIONS

Lamble et al., "Detection thresholds in car following situations and peripheral vision: implications for positioning of visually demanding in-car displays", Ergonomics, 1999, vol. 42, No. 6, 807-815, 9 pages.

(Continued)

*Primary Examiner* — Nader Bolourchi
(74) *Attorney, Agent, or Firm* — James Nock; Andrew D. Wright; Roberts Mlotkowski Safran Cole & Calderon P.C.

(57) ABSTRACT

A display of roadside objects on a vehicle windshield within a primary field of view of a driver, with an indication of a level of importance of the object is provided. A method includes: detecting, by a computer device, a roadside object in a vehicle driver's peripheral view; analyzing, by the computer device, the detected roadside object to assign a level of importance to the object based on predefined levels of importance; and displaying, by the computer device, the roadside object as a semi-transparent object in a display area of a windshield of the vehicle with an indication of the level of importance of the object.

20 Claims, 5 Drawing Sheets

(51) Int. Cl.
  *B60W 30/095* (2012.01)
  *G06K 9/00* (2006.01)
  *G06T 19/00* (2011.01)
  *G02B 27/01* (2006.01)

(56) References Cited

U.S. PATENT DOCUMENTS

| | | | |
|---|---|---|---|
| 9,162,622 | B2 | 10/2015 | Szczerba et al. |
| 9,852,632 | B2 | 12/2017 | Sempuku |
| 10,067,341 | B1 * | 9/2018 | Breed .................... G02B 27/01 |
| 2009/0312888 | A1 | 12/2009 | Sckert et al. |
| 2010/0253540 | A1 | 10/2010 | Seder et al. |
| 2010/0253542 | A1 | 10/2010 | Seder et al. |
| 2010/0253594 | A1 | 10/2010 | Szczerba et al. |
| 2012/0224060 | A1 | 9/2012 | Gurevich et al. |
| 2016/0163108 | A1 | 6/2016 | Kim |
| 2016/0170487 | A1 * | 6/2016 | Saisho ............... G01C 21/3635 |
| 2016/0203641 | A1 * | 7/2016 | Bostick ............. G02B 27/0172 |
| | | | 345/633 |
| 2017/0269684 | A1 | 9/2017 | Murai |
| 2018/0178811 | A1 * | 6/2018 | Ohta ........................ B60R 1/00 |

OTHER PUBLICATIONS

Hitachi Construction Machinery Co. Ltd., "Hitachi Introduces Aerial Angle Peripheral Vision Display System." https://www.oemoffhighway.com/electronics/sensors/proximity-detection-safety-systems/press-release/12264665/hitachi-introduces-aerial-angle-peripheral-vision-display-system, Oct. 3, 2016, 2 pages.

Abdi et al.,"In-Vehicle Augmented Reality Traffic Information System: A New Type of Communication Between Driver and Vehicle." Procedia Computer Science 73 (2015) 242-249, 8 pages.

Yoo et al., "Display of HUD Warnings to Drivers: Determining an Optimal Location." Technical Report UMTRI-99-9 Apr. 1999, The University of Michigan, Transportation Research Institute (UMTRI), 79 pages.

Anonymous, "System and method about display information on HUD car Problem statement and background." IP.com Disclosure No. IPCOM000252339D, Jan. 5, 2018, 5 pages.

Park et al., "Augmented reality for collision warning and path guide in a vehicle." In Proceedings of the 21st ACM Symposium on Virtual Reality Software and Technology (VRST '15), ACM, New York, NY, USA, 195-195, 2015, 1 page.

Kim et al., "Look at Me: Augmented Reality Pedestrian Warning System Using an In-Vehicle Volumetric Head Up Display." In Proceedings of the 21st International Conference on Intelligent User Interfaces (IUI '16), ACM, New York, NY, USA, 294-298, 2016, 5 pages.

Jose et al., "A comparative study of simulated augmented reality displays for vehicle navigation." In Proceedings of the 28th Australian Conference on Computer-Human Interaction (OzCHI '16), ACM, New York, NY, USA, 40-48, 2016, 9 pages.

Anonymous, "Peripheral vision", https://en.wikipedia.org/wiki/Peripheral_vision, accessed Jun. 7, 2018, 7 pages.

"List of IBM Patents or Patent Applications Treated as Related", dated Nov. 26, 2019, 1 page.

Specification "Augmented Reality-Based Roadside Content Viewing Within Primary Field of View" and drawings in related U.S. Appl. No. 16/692,561, filed Nov. 22, 2019, 42 pages.

* cited by examiner

AUGMENTED REALITY-BASED ROADSIDE CONTENT VIEWING WITHIN PRIMARY FIELD OF VIEW

BACKGROUND

The present invention generally relates to providing a display on a vehicle windshield of roadside objects on a windshield of a vehicle, and, more particularly, to providing a display of roadside objects on a vehicle windshield within a primary field of view of a driver, with an indication of a level of importance of the object.

When driving a vehicle, drivers generally focus straight ahead of the vehicle in order to avoid striking objects directly in front of the vehicle, and to stay within the desired lane of the roadway. However, drivers typically also periodically check other vantage points within their peripheral vision, in many cases moving their heads in a left or right direction. On the other hand, it is important to be aware of roadside objects in the driver's peripheral view since, in some instances, these objects may be quite close to the edge of the lane that the vehicle is in. Also, in some instances, such roadside objects may actually be moving into the vehicle's lane of travel, for example, a moving person or animal, or a vehicle about to pull into the main roadway.

SUMMARY

In a first aspect of the invention, there is a method for detecting, by a computer device, a roadside object in a vehicle driver's peripheral view, analyzing, by the computer device, the detected roadside object to assign a level of importance to the object based on predefined levels of importance, and displaying, by the computer device, the roadside object as a semi-transparent object in a display area of a windshield of the vehicle with an indication of the level of importance of the object.

In another aspect of the invention, there is a computer-based system for augmenting roadside content viewing in a moving vehicle, including a processor, a computer readable memory, and a computer readable storage medium associated with a computer device. The system includes: program instructions to detect, via at least one of front and side cameras on the vehicle, an object of interest in a driver's mid and far peripheral view, which is 30° or greater on either side of a centerline of the driver's view looking directly ahead of the vehicle; program instructions to analyze the object, using image analytics, to determine a level of importance of the object relative to predefined levels of importance; and program instructions to, if the analysis determines the object exceeds a predetermined level of importance, color code the object in accordance with the determined level of importance and display the object as a semi-transparent object in a display area of a windshield of the moving vehicle. The program instructions are stored on the computer readable storage medium for execution by the CPU via the computer readable memory.

In another aspect of the invention, there is a computer program product including a computer readable storage medium having program instructions embodied therewith, the program instructions executable by a computer device to cause the computer device to detect: a roadside object in at least one of a vehicle driver's mid and/or far peripheral view, which is 30° or greater on either side of a centerline of the driver's view looking directly ahead of the vehicle; analyze the detected roadside object to assign a level of severity to the object based on predefined levels of severity; and display the roadside object as a semi-transparent object in a display area of a windshield of the vehicle with an indication of the level of severity of the object, wherein the indication of the level of severity of the roadside object is provided by color coding of a portion of the displayed semi-transparent object.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
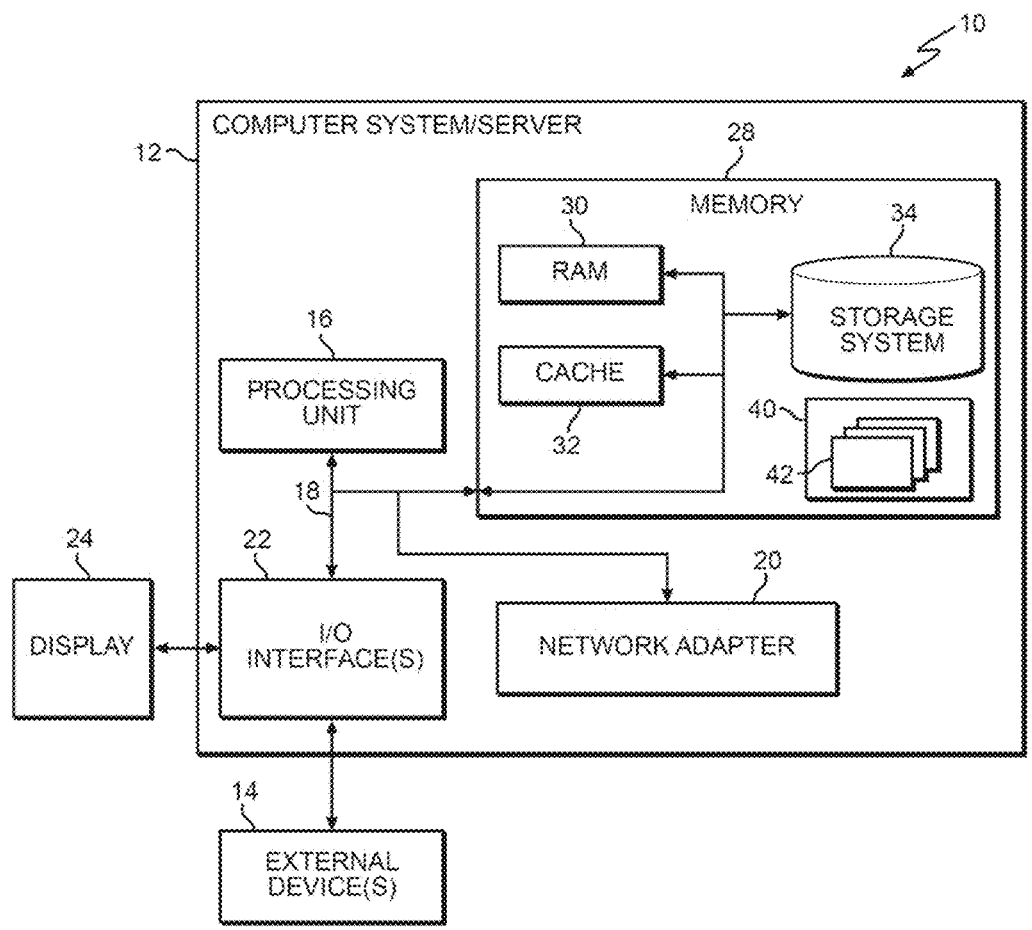
FIG. 1 depicts a computing infrastructure according to an embodiment of the present invention.

The present invention generally relates to providing a display on a vehicle windshield of roadside objects within a primary field of view of a driver, with an indication of a level of importance of the object. Aspects of the invention include augmenting roadside content viewing in a moving vehicle by detecting, via front-end side cameras on the vehicle, objects of interest in the moving vehicle's mid and far peripheral view analyzing the objects using image analytics to determine the importance of the objects, and, if the analysis determines that the objects are important, the objects are classified, color-coded and displayed as semi-transparent objects on a display area of a windshield of the moving vehicle, Aspects of the invention also include providing a windshield in a vehicle that is transparent in a primary view (also known as a paracentral view) with the ability to display objects in a semi-transparent form together with an identification of importance, or severity, in the paracentral view or the macular view (or at least within a near peripheral view) of the driver. It is noted that different views referred to herein will be discussed in detail below with regard to FIG. 2.

For example, objects directly in front of a vehicle are generally visible to the driver since they are within a paracentral view of the driver, and, therefore, can be clearly observed. However, objects which are within the driver's peripheral vision are more difficult to observe unless the driver moves his or her head. This requires the driver to lose focus on what is occurring directly in front of the vehicle, and can, in some cases, lead to accidents, with resultant damage and injury.

In particular, objects in a driver's medium or far peripheral view, i.e., more than 30° on either side of the centerline of the driver's view looking directly ahead of the vehicle, are more difficult for the driver to see without turning their head. Objects in the driver's near peripheral view, i.e., between 4° and 30° of the centerline of the driver's view, can generally be seen without moving one's head, but are not as immediately apparent to the driver as objects displayed within the paracentral view, that is 4° of the centerline of the driver's view.

This can create difficulties in clearly maintaining concentration with regard to objects directly in front of the vehicle.

At the same time, objects within the peripheral view of the driver can sometimes be dangerous. For example, vehicles on the side of the road may have occupants opening a door, changing tires, removing objects from the trunk of the vehicle, etc. As such, there is the danger that the vehicle occupants, or an opened door, may intrude into the vehicle's path. Also, objects in the driver's peripheral view might, themselves, be moving, for example, animals, moving tires, etc. Again, such objects might soon intrude in the vehicle's path, even if they currently do not intrude.

In accordance with aspects of the invention, cameras mounted on each side of the vehicle can be provided which are forward facing, and adjustable based on speed of the vehicle to provide a real-time video stream of roadside objects in the driver's mid and far peripheral views. If desired, cameras could also be provided other portions of the vehicle, such as along the front or on the top of the vehicle, in which case the cameras can be appropriately positioned to detect peripheral roadside objects. It is noted that, for purposes of this specification, the term "roadside object" is also intended to include objects in a lane adjacent to the lane the vehicle is currently traveling in, whether the adjacent lane is for traveling in the same direction or for oncoming traffic. In addition, sensors can be provided on each side of the vehicle, or the front or top, to provide additional information regarding such roadside objects. Also, although the description is primarily directed to detecting roadside objects in the mid-and far peripheral regions of the driver's vision, the principles of the invention can also be used for detecting, analyzing and displaying objects in the near peripheral region, particularly those beyond the macular view of the driver view (i.e., 9° to the left or the right of the centerline of the driver's view).

In implementations, the system visually presents roadside objects to the user on the side of the windshield in front of the driver. For example, the roadside objects can be presented as semi-transparent objects on the lower left or lower right portion of the windshield directly in front of the driver, so as to preferably fall into the driver's paracentral view or, at the very least, within the near peripheral review of the driver. As a result, the driver does not have to move their head to view the peripheral roadside objects. Accordingly, implementation of the invention provides for enhanced vehicle safety.

Aspects of the invention include providing cognitive software to perform analysis of the roadside objects in the user's peripheral view using image analytics to identify the importance of the objects and to determine if the object should be displayed with a higher alert level. For example, color coding can be provided along with the display of the semi-transparent object to identify the relative danger level the object is determined to have. For example, color-coded outlines may be provided of the object indicative of the level of danger the object is determined to have from the cognitive analysis. Implementations could include providing a red outline of the object for a high risk roadside object, a yellow outline for a medium risk object and a green outline, or no outline, for a low risk object. Embodiments also include providing text, which could also be color coded based on the determined risk posed by the object. The text, for example, can include information regarding distance and time to reach the object in the display area adjacent the displayed object. Alternatively, or in addition, the text can identify the object. As examples regarding color coding, a broken down vehicle with a motorist alongside changing a tire would be identified in red to alert the driver, whereas a vehicle parked off the side of the road with no occupants outside the vehicle can be identified in yellow.

Aspects of the invention also include the cognitive software performing a comparative analysis of the objects both directly in front of the vehicle and along the roadside using image analytics to temporarily disable the roadside object display in the driver's primary or paracentral view when it is determined that a dangerous situation exists immediately ahead of the vehicle. Disabling the display of the roadside objects can continue until the vehicle has passed the trouble spot. This allows providing the driver full focus on what is directly ahead of them. Implementations can also include providing a semi-transparent display in the primary or paracentral view of the driver highlighting the object directly in front of the vehicle in the primary view, while disabling the display of any roadside objects in the peripheral view.

Further aspects of the invention include utilizing cognitive software to identify objects in the peripheral view of the vehicle driver that have been determined to be of interest to the driver as opposed to objects which pose some degree of risk to the driver. For example, if it has been determined that a driver has a particular interest in certain products, a display can be provided in the driver's primary or paracentral view related to such interests. For example, a billboard advertisement for an outlet mall with a shoe store may be displayed if this has been determined from cognitive analysis using conventional cognitive analysis computing techniques to be of personal interest to the driver. Implementations include configuring the cognitive software to learn of individual driver's interests regarding roadside objects or attractions based on correlation of biometric feedback (such as facial expressions and focus determined from a camera monitoring the driver, or heart rate, determined, for example, from a smart watch) with historical acts of the driver regarding going to particular attractions. In conjunction with this, cognitive software in accordance with aspects of the invention can update the user's interests for future evaluation of roadside objects or attractions.

Embodiments of the invention are premised on the fact that there is a range of potential objects that can exist alongside a lane in which a vehicle is traveling. Implementations determine the existence of such objects in the distance ahead by camera and/or sensor observation, and, utilizing cognitive software, determine if the roadside objects have a level of importance, including a level of risk or severity to the driver to warrant providing a warning. For example, if an upcoming vehicle is determined to be an abandoned vehicle with hazard lights blinking, cognitive analysis might determine this to be a roadside object which the driver should be alerted to. If there are people outside of the vehicle, for example, changing a tire, or very close to the roadway, the driver would receive a critical alert. As an example, situations often exist where a safety officer is outside of a vehicle, parked on the shoulder, talking with a driver, which can pose a significant hazard both to the safety officer and the driver of the moving vehicle. Embodiments of the present invention can provide an alert of such situations by providing a semi-transparent display within a portion of the windshield which is easily viewed by the driver, without the need for the driver to move their head. As such, the driver can be made aware of roadside objects in their peripheral view which might pose danger, without having to lose sight of what is occurring directly ahead of the vehicle.

In other embodiments, interests of the driver can be predefined or learned, and such interests can be used for purposes of determining appropriate displays based not on possible hazards, but, instead, the drivers interests. For example, cognitive software can perform an analysis of facial expression and actions to determine what objects along a roadside might interest a driver. In embodiments, the cognitive software can also account for historical data, such as learning that the driver likes to stop it outlet malls. In such a case, the driver can be alerted of billboards are other signs in the peripheral view of the driver.

The cognitive analysis can also take into account the interests of other occupants of the vehicle, if desired. For example, if predefined or learned data is provided regarding a passenger liking a certain type of store or activity, a display can be provided in the central or paracentral view of the driver (or the central or paracentral view of the passenger) when roadside objects pertaining to not only the driver's interests but also the passenger's interests are detected. Thus, a certain roadside object, such as a billboard, might not be of any interest to the driver, and, therefore would not normally be displayed with any special annotation, but a special annotation would be added if a particular passenger determined to have an interest in the roadside object or attraction by cognitive analysis.

As such, aspects of the invention provide an augmented reality system by which roadside objects can be displayed within a primary focus area of the driver as semi-transparent objects on a transparent display windshield on the driver's side. This will allow the driver to keep focus directly ahead of the moving vehicle, for example, in the paracentral view, while still being able to see roadside objects that are further out in the peripheral view of the driver, without the need for the driver to move their head, thereby providing enhanced vehicle safety.

Regarding this, conventional systems display a rear view of a vehicle backing up on a dashboard display, utilizing video cameras to provide the rear view. However, such systems do not provide side-mounted, or front mounted, cameras and sensors to capture real-time video and sensed information regarding roadside peripheral objects ahead of, or alongside of, the vehicle. Nor do such systems provide an analysis of roadside objects based on importance or severity of the objects, or the interests of a driver or other occupants to determine how they should be displayed on the windshield as semi-transparent objects within a primary focus area of the driver.

Also, conventional systems provide displays on a windshield regarding vehicle controls, such as a current speed of the vehicle. However, again, such displays do not pertain to the ability to see and display roadside objects ahead of the vehicle, or an analysis of roadside objects based on importance or severity of the objects, or the interests of a driver or other occupants to determine how they should be displayed on the windshield as semi-transparent objects within a primary focus area of the driver.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
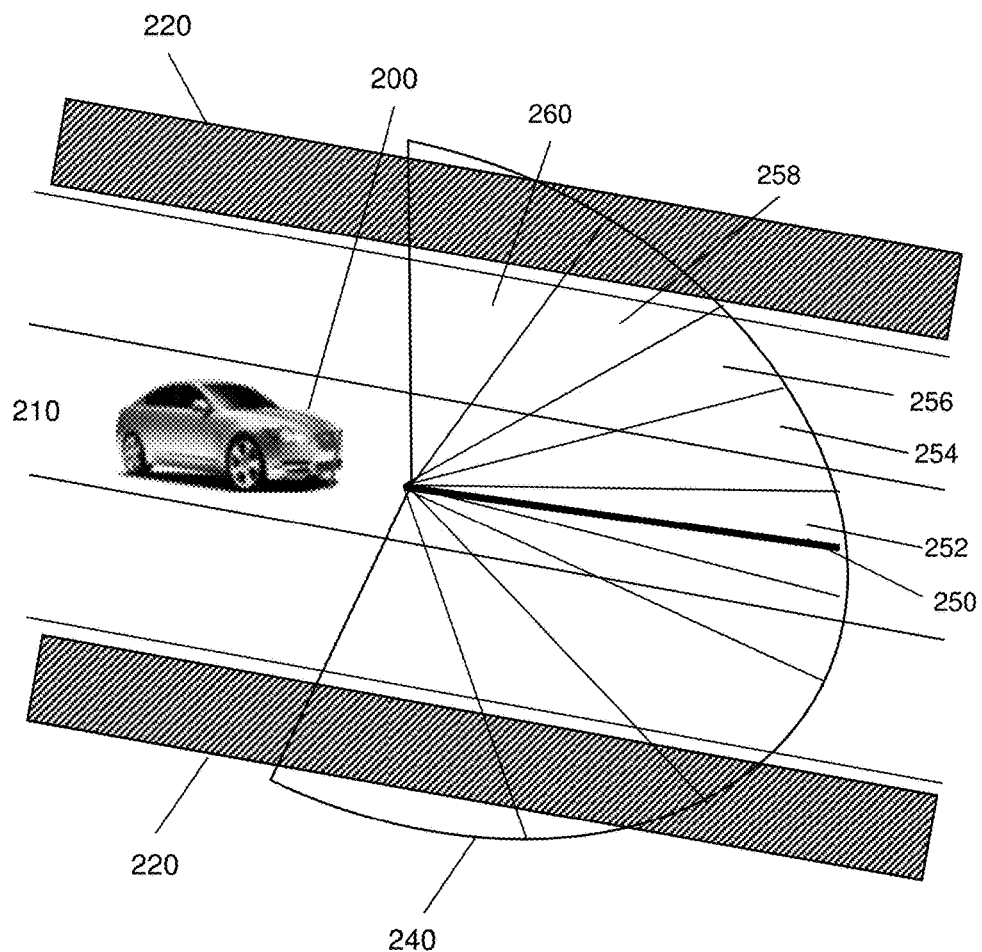
FIG. 2 shows an environment in which the invention can be used, in accordance with aspects of the invention.

FIG. 2 shows an environment in which the invention can be used, in accordance with aspects of the invention. In embodiments, a system in accordance with the invention is used in a vehicle 200 in a lane of travel on a road 210. In accordance with aspects of the invention, a computing infrastructure such as shown in FIG. 1 is utilized by a driver of a vehicle 200 to detect and display roadside objects 220 located in the vehicle drivers peripheral view, such that the driver can view the display of such objects in the windshield without the necessity of the driver turning their head.

In embodiments, the driver's field-of-view 240 is broken down into the regions shown in FIG. 2, specifically, a paracentral region 252, which is 8° in width (and which is centered around a central region, not shown, which is 5° in width), a macular region 254, which is 18° in width, a near peripheral region 256, which is 60° in width, a mid-peripheral region 258, which is 120° in width, and a far peripheral region 260, which is between 200° and 220° in width, depending upon the acuteness of a particular driver's peripheral vision. As can be appreciated from FIG. 2, each of these regions is equally distributed around a centerline axis 250 of the driver's view looking directly ahead of the vehicle, so that, for example, the 60° near peripheral region 256 is shown as 30° to the right of the centerline axis 250 of the driver's centerline of vision and 30° to the left of the centerline axis 250 of the driver's centerline of vision. It is also noted that in this description the vehicle driver's peripheral view is regarded as including the near peripheral region 256, the mid-peripheral region 258 and the far peripheral region 260 shown in FIG. 2.

Figure 3:
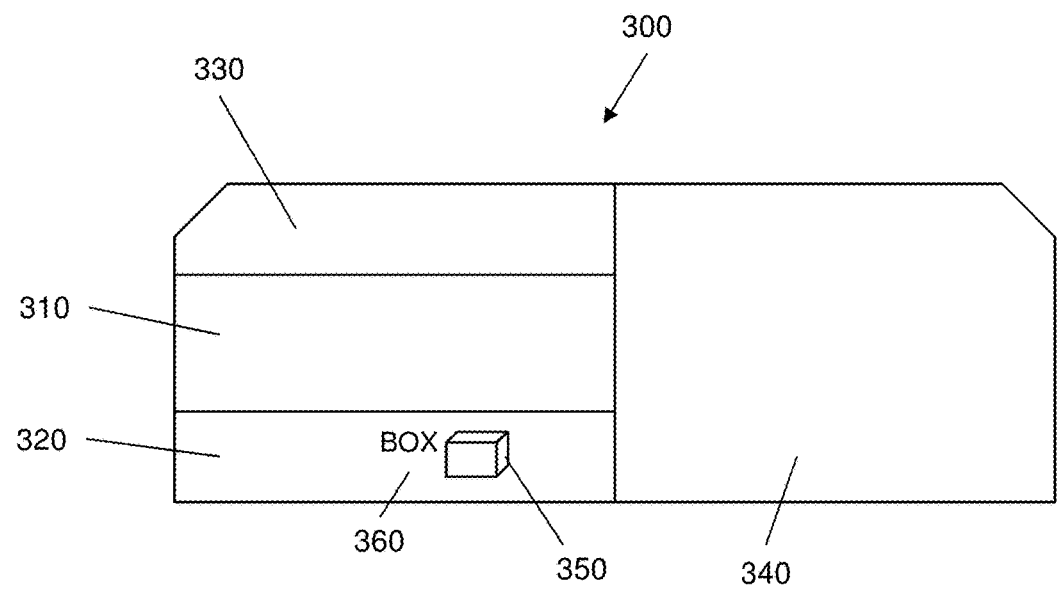
FIG. 3 shows an example of a windshield display in accordance with aspects of the invention.

FIG. 3 shows an example of a windshield display in accordance with aspects of the invention. In embodiments, the vehicle 200 shown in FIG. 2 includes a windshield 300 shown in FIG. 3. In aspects of the invention, the windshield 300 includes a transparent area 310 on the driver's side, a lower display area 320 on the driver's side and an upper display area 330 on the driver's side to provide an Augmented Reality (AR) display on the display areas 320 and/or 330 the windshield 300. The display areas 320 and 330 can also be transparent, but designed for the display of roadside objects 350 and text 360 labeling the roadside objects, wherein the displayed roadside objects 350 and text 360 are semi-transparent. Alternatively, the display areas 320 and 330 can be semi-transparent, and the displayed objects 350 and text 360 can be opaque. Although both a lower display area 320 and an upper display area 330 are shown, it is to be understood that the windshield 300 could include only one or the other of these display areas. It is noted that the text 360, for example, can include information regarding distance and time to reach the object in the display area adjacent the displayed object. Alternatively, or in addition, the text 360 can identify the object.

The windshield 300 also includes a transparent area 340 on the passenger side of the vehicle 200. In embodiments, the transparent area 340 can also include either one or both of display areas 320 and 330, for example, for displaying objects of interest to an occupant who is passenger rather than a driver.

Figure 4:
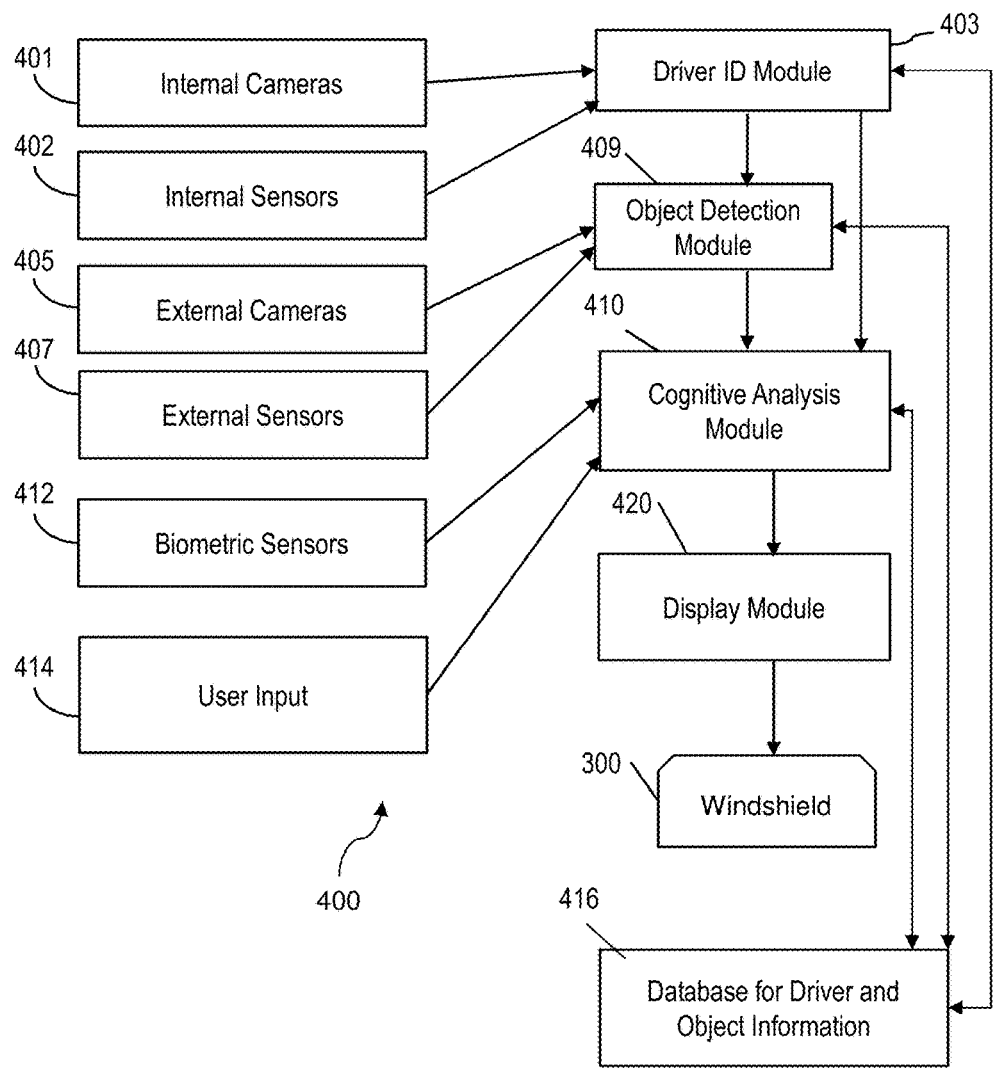
FIG. 4 shows a block diagram of an exemplary embodiment in accordance with aspects of the invention.

FIG. 4 is a block diagram illustrating a roadside content viewing system 400 in accordance with aspects of the present invention. In particular, the system 400 includes internal cameras 401 and internal sensors 402 inside the vehicle 200 to provide identification information regarding a driver, and, if desired, other vehicle occupants, to a driver ID module 403. Also, external cameras 405 and external sensors 407 provide information regarding roadside objects 220 to an object detection module 409. Outputs of both the driver ID module 403 and the object detection module 409 are provided to a cognitive analysis module 410, as will be discussed later. A database 416 is connected to the modules 403, 409 and 410 to provide data to the respective modules and to be updated by new data recorded and developed by the respective modules.

In addition, user input 414 can be provided to the cognitive analysis module 410 to allow a user, including both the vehicle driver and occupants, to provide information regarding their interests to the cognitive analysis module 410. It is noted that the roadside content viewing system 400 can be implemented by the computer system/server 12 of FIG. 1, and that the modules 403, 409, and 410 correspond to program modules 42 of FIG. 1. It is further noted that the cognitive analysis module 410 can be a conventional cognitive analysis computer system with the capability of using input data in the form of image data and other sensor data to identify objects and people using image analytics, and to provide an analysis of the respective importance of detected objects, as well as interests of vehicle occupants. The cognitive analysis module 410 provides outputs to both the database 416 and a display module 420. The display module 420 includes a projection arrangement to provide a display of semi-transparent objects 350 and/or text 360 on the display areas 320 and 330 shown in FIG. 3. It is noted that the projection arrangement utilized by the display module 420 can be implemented by conventional projection systems used for projecting semi-transparent information or images, such as the current vehicle speed, on an internal surface of a windshield. The display module 420 corresponds to one of the program modules 42 of FIG. 1.

The external cameras 405 can be mounted on each side of the vehicle 200 to capture real-time video of objects in at least the mid-peripheral and far peripheral view of the driver. In embodiments, the side-mounted external cameras 405 can also capture real-time video of some or all of the near peripheral view of the driver, if desired. Also, one or more external cameras 405 can be mounted in the front of the vehicle, or on the top of the vehicle, to capture real-time video in the paracentral and near peripheral view of the driver. The angle of the external cameras 405 can be adjusted, if desired, based upon the speed of the vehicle and also based upon predetermined peripheral areas which are desired to be covered, for example, whether the external cameras 405 are to cover only the mid-peripheral and far peripheral regions of the driver's view, or the near peripheral and mid-peripheral regions of the driver's view, or all three peripheral regions of the driver's view.

In addition, one or more external sensors 407 can be mounted on the sides, front and/or top of the vehicle 200 to detect information regarding distance and time to reach roadside objects 220, and to provide such additional information for analyzing and determining the level of importance or interest of such roadside objects to the object detection module 409 and the cognitive analysis module 410. It is noted that the external cameras 405 and sensors 407 mounted outside the vehicle 200 provide data to the cognitive analysis module 410 shown in FIG. 4 for performing the analysis of the detected roadside objects to assign a level of importance of the detected objects based on predefined levels of importance. With regard to this, it is noted that these external cameras 405 and external sensors 407 can include conventional external cameras and external sensors such as currently used in vehicles for purposes of accident avoidance. As such, inclusion of such external sensors 407 and external cameras 405 outside the vehicle extends existing techniques for detecting peripheral roadside objects or objects directly in front of the vehicle from simply accident avoidance to also providing a visual alert on the windshield regarding potentially dangerous roadside objects or objects of interest to the vehicle occupants.

In addition to external cameras mounted outside the vehicle, as discussed above, one or more internal cameras 401 can be mounted inside the vehicle 200 to observe facial expressions of the driver and, if desired, passengers to assist in determining interests of the driver and/or passengers. In addition, other internal sensors 402, such as a key fob detector, biometric sensors, etc., can also be provided to facilitate the identification of the driver, or other occupants, as well as for providing data regarding interests of the driver and other occupants.

In addition, a computer infrastructure 10 such as shown in FIG. 1, including the system 400 shown in FIG. 4, for implementing the invention can be included entirely within the vehicle 200 itself, either as a factory installed device, a dealer installed device or a separate independent device provided by the vehicle owner. Alternatively, the vehicle 200 can include transmission/reception elements to transmit information obtained from the cameras and sensors mounted on and in the vehicle 200 via the cloud to a remote cognitive analysis computing system. This transmission/reception can be implemented using a conventional network service (i.e., 3G, 4G, LTE etc.) from the vehicle 200 for real-time streaming of data to a remote cognitive module 410 for analysis.

In the case of using a remote cognitive analysis module 410, the remote cognitive analysis module 410 performs the analysis to determine the level of importance or interest of the sensed roadside objects, using conventional cognitive computing techniques. After the cognitive analysis is performed, the remote cognitive analysis module transmits information regarding the level of importance or interest of the roadside objects to the display module 420 in the vehicle 200 for the display of the roadside objects as semi-transparent objects 350 and text 360 in one of the display areas 320 and 330 on the windshield 300.

The inclusion of the display areas 320 and 330 on the windshield 300 allows for a display of roadside objects located in the near, mid or far peripheral areas of the driver's vision, together with an indication of the relative importance or interest of the objects. In particular, the display of the roadside objects as semi-transparent objects 350 can be provided with an indication of the level of importance or interest of the object, such as by color coding, as well as text 360 (which can also be color-coded based on level of importance or interest), all within a display area 320 and/or 330 which can readily be viewed by the driver (preferably within the paracentral or macular field-of-view, but, at least, within the near peripheral field of view of the driver).

As also discussed above, the display of roadside objects 220 located within the peripheral views of the driver can be temporarily disabled if a front mounted camera and/or sensor detects an object directly in front of the vehicle which is determined by cognitive analysis within the cognitive analysis module 410 of FIG. 4 to be of relatively high severity (i.e., likely to cause a collision in the near future).

In embodiments, cognitive software within the cognitive analysis module 410 shown in FIG. 4 performs analysis of the detected roadside objects 220 in the driver's peripheral view (near, mid-or far peripheral regions) using image analytics to identify the importance of objects and to determine if the objects should be displayed with a high alert level, a medium alert level or low alert level. For example, the semi-transparent displayed roadside objects 350 and the identifying text 360 can be color-coded to identify the relative level of importance/severity or the relative level of interest. To this end, the cognitive analysis software in the cognitive analysis module 410 analyzes the detected roadside object detected by the object detection module 409 using image analytics by comparing it to data in the database 416 regarding possible roadside objects stored within the database 416 of FIG. 4.

Possible roadside objects can be preloaded into the database 416 using the user input 414. In addition, over the course of time, new possible roadside objects can be added based upon the learning operation performed by the cognitive analysis software in the cognitive analysis module 410 utilizing conventional cognitive analysis and learning techniques. Based upon the identification of the detected roadside object, a relative level of importance can be assigned to the detected roadside object based on predefined levels of importance, which are also stored in the database 416. It is noted that the database 416 can be implemented as part of the system memory 28 shown in FIG. 1.

It is also noted that a vehicle manufacturer may store predefined objects that are likely to be detected by either the forward facing cameras or the side-mounted cameras, such as police vehicles, different types of animals, specific types of other vehicles, etc., in the database 416. In addition, the manufacturer can preprogram levels of expected severity for purposes of color coding the pre-stored objects. Similarly, individual users can specify a level of severity, using the user input 414, with regard to objects which they are particularly concerned with. For example, if a user frequently drives in areas with high deer populations, the user could program the database 416 to always identify deer with a high severity rating.

As an example, if the cognitive analysis is performed with regard to a broken down vehicle on the side of the road, and, if it is also detected that a motorist is outside of the vehicle, for example, changing a tire, this would be assigned a high level of importance since this would be regarded as a high severity object. Therefore, both the displayed roadside object 350 and the text 360 could be color-coded in a first color, such as red, to indicate the existence of a high severity roadside object 220. On the other hand, if the detected object was merely a car parked off the road, without any people outside of the vehicle, this could be regarded as a medium severity object, and the displayed semi-transparent roadside object 350 and/or corresponding text 360 could be color-coded in a second color, such as yellow. As a further example, if the detected roadside object 220 is relatively small, and appears not to be dangerous, such as a small to medium-sized box, as shown in the example of FIG. 3, the displayed semi-transparent roadside object 350 and/or corresponding text 360 could be color-coded in a third color, such as green. The colors red, yellow and green are, of course, solely for purposes of non-limiting example. It is noted that the color coding could be the entire displayed object 350 and/or text 360, or a color-coded outline encircling the displayed object 350 and/or text 360. It is also noted that other forms of indications related to levels of importance or severity could be provided, such as flashing displays, with the frequency of flashing depending on the level of sensitivity. Audible alerts could also be provided in conjunction with the displayed output and text.

In embodiments, the cognitive analysis module 410 can also perform comparative analysis of objects using image analytics with regard to objects in the primary paracentral view of the driver of the vehicle 200 and roadside objects in the secondary peripheral view of the driver. In other words, a comparative analysis of objects is performed with regard to objects which are in the primary paracentral view of the driver, and therefore likely to be struck if the vehicle proceeds, and roadside objects which are far enough within the secondary peripheral view (either near, mid-or far peripheral view) as to be unlikely to be struck by the moving vehicle 200. Based upon this comparative analysis of the objects, if it is determined by the cognitive analysis software and the cognitive analysis module 410 that a high severity condition exists in the primary paracentral view, such as an accident ahead or a tire in the roadway lane of the vehicle 200 which is likely to be struck if the vehicle proceeds, the roadside object display in the display areas 320 and/or 330 of objects 220 in the secondary peripheral view of the driver will be temporarily disabled. This allows the driver to focus full attention on the high severity object directly within the primary paracentral view.

It is noted that, if desired, the display areas 320 and 330 can also replace the displayed semi-transparent roadside objects 350 and text 360 with a semi-transparent display in the display areas 320 and 330 of the high severity object directly in front of the moving vehicle 200, preferably with an indication such as a flashing display and/or audible alert of the high likelihood of a collision. The temporary disabling can be removed, in other words, the display of the roadside objects 220 as semi-transparent objects 350 can be re-enabled in the lower and upper display areas 320 and 330 when the comparative cognitive analysis software in the cognitive analysis module 410 indicates that the trouble spot within the drivers paracentral view has been passed.

In addition to identifying objects based on the relative severity of the detected objects in accordance with expected amounts of damage and injury if the vehicle strikes the roadside objects, cognitive software in the computer system 12 can also identify objects 220 in the peripheral views of the current vehicle driver that are of interest to the driver, as opposed to representing a risk to the driver and/or passengers. As an example, a billboard advertisement for an outlet mall which includes a particular store of interest to the driver and/or passengers can be displayed as semi-transparent roadside objects 350 and/or corresponding text 360. Color coding, or other indications of relative importance, can be assigned based upon a determined level of interest of the driver and/or passengers, in the same manner discussed above with regard to analyzing the relative importance of roadside objects 220 based on the relative severity of their risk likelihood.

With regard to determining the interests of roadside objects 220, the cognitive analysis software in the cognitive analysis system 410 can learn the driver's interest in such roadside objects or attractions based upon a correlation determined by cognitive analysis of biometric feedback (e.g., facial expressions and focus of viewing from the internal cameras 401 and biometric data such as heart rate from internal sensors 402) with historical actions, and user input, stored in the database 416 regarding the driver and/or passengers going to attractions. The cognitive analysis module 410 can update the user's interest in database 416 for future evaluations based upon ongoing data received from the above-noted cameras and sensors for future evaluation with regard to roadside objects and/or attractions, and user input.

Figure 5:
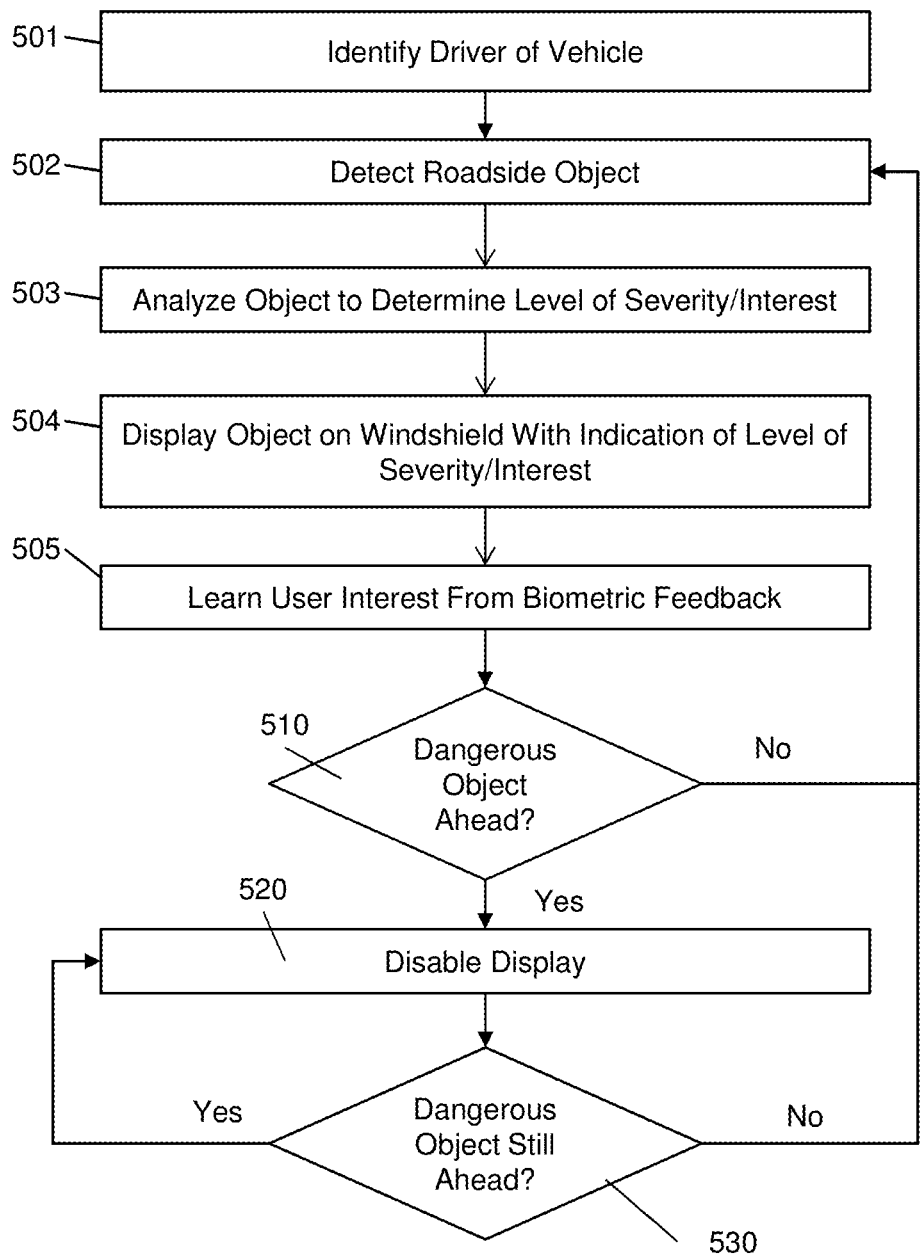
FIG. 5 shows a flowchart of an exemplary method in accordance with aspects of the invention

FIG. 5 shows a flow chart of an exemplary method in accordance with aspects of the invention. It is noted that this flowchart can be implemented with a roadside content viewing system for shown in FIG. 4, using the cognitive analysis module 410 performing image analytics utilizing conventional cognitive analysis techniques, to provide a display of roadside objects 220 on the display areas 320 and/or 330 of the windshield 300 of the vehicle 200, as shown in FIGS. 2 and 3. It is further noted that the flowchart can be implemented to display the roadside objects 220 as semi-transparent objects 350 with semi-transparent text 360 in display areas such as 320 and 330 of the windshield 300 shown in FIG. 3.

At step 501, the system identifies a driver of the vehicle 200. This identification can be performed in a number of different ways, using internal cameras 401, internal sensors 402 and the driver ID module 403 of FIG. 4. For example, a key fob can be sensed by the internal sensors 402 and associated by the driver ID module 403 with the driver so that, when a specific driver starts a vehicle with a particular key fob, the driver will be identified. Once identification has been made, the cognitive analysis module 410 will make settings regarding known interests of the particular driver to facilitate displaying roadside objects of interest, as discussed above. Regarding this form of identification, it is noted that some vehicles have the ability to configure vehicle settings, such as seat position, by associating a specific driver to a specific key fob. In aspects of the invention, the identification techniques for relating specific drivers to specific key fobs for such adjustments can be extended for use in making settings and determining interests for particular drivers to tailor the windshield display, in accordance with embodiments of the present invention.

In embodiments, the identification of the driver at step 501 can also be performed using facial recognition. In this case, one or more cameras 401 inside the vehicle 200 takes an image of the driver, as discussed above. The database 416 of FIG. 4 stores facial images for driver registration purposes. In embodiments, the cognitive analysis module 410 compares the facial image with a vehicle driver repository stored in database 416 to identify the driver. Once this identification has been made, the cognitive analysis module 410 makes settings and identifies interests with regard to the identified driver to facilitate displaying roadside objects of interest, as discussed above.

In other aspects of the invention, it is noted that in addition to stored interests for individual drivers, each driver or occupant can also input information regarding their particular interests, if desired, so that these can be utilized with regard to displaying roadside objects of interest. As discussed above, in addition to identifying the vehicle driver, other occupants can also be identified utilizing cameras 401 mounted inside the vehicle, in which case the cognitive analysis module 410 will make appropriate settings and determine interests associated with these other occupants for purposes of identifying roadside objects of interest to such other occupants in accordance with embodiments of the present invention. It is also noted that an analysis of the occupant's, including the driver's, social media usage could be performed with the cognitive analysis module 410 to determine interests of the occupants, which are then stored in the database 416.

At step 502, the object detection module 409 detects roadside objects 220 using the external cameras 405 and external sensors 407 mounted on the vehicle 200, as discussed above with regard to FIGS. 2-4. As discussed with regard to FIGS. 2-4, real-time video from the external cameras 405 and real-time data regarding distances, speeds etc. from the external sensors 407 are provided to the object detection module 409. The object detection module 409, together with the cognitive analysis module 410, uses image analytics to identify objects by comparing the data received from the external cameras 405 and external sensors 407 with known object information stored in the database 416.

At step 503, the cognitive analysis module 410 analyzes the objects detected by the object detection module 409 based on predetermined levels of importance provided by the database 416. As discussed above with reference to FIGS. 2-4, the level of importance can be in terms of a level of severity, that is, the likelihood that the detected objects are likely to cause damage and/or injury to the vehicle or the occupants. Alternatively, the level of importance can pertain to the level of interest which has been determined for the driver or other occupants based on cognitive analysis of data obtained by the internal cameras 401, the internal sensors 402, a social media analysis, and stored information regarding user interests from the database 416.

At step 504, the display module 420 displays semi-transparent objects 350 and text 360 on the display areas 320 and/or 330 of the windshield 300, as discussed above with to FIGS. 2-4. The display of the semi-transparent objects 350 and text 360 includes an indication of the level of importance, for example, the level of severity in the case of possible risk, or the level of interest by occupants of the vehicle in particular services or activities regarding detected roadside objects. As discussed above with regard to FIGS. 2-4, the indication of level of importance can be done by color coding, the wording of the text 360, the rate of flashing of the displayed objects and/or audible alerts.

At step 505, the cognitive analysis module 410 learns information regarding user interest of the occupants, including the driver, from biometric feedback or other information. This information regarding user interest is then provided to the database 416 to update the information therein regarding the driver and other occupants for use with roadside objects identified in the future, that is, to adjust the display of such detected roadside objects based upon the learned information regarding user interest in particular roadside objects, as discussed above with regard to FIGS. 2-4.

At step 510, the object detection module 409 and the cognitive analysis module 410 use information received from external cameras 405 and external sensors 407 monitoring the paracentral region of the driver's vision directly in front of the vehicle 200 to determine if a dangerous object lies directly ahead of the vehicle, and if the rate of closure with the dangerous object is fast enough that a dangerous collision is likely. If the possibility of a such a collision is determined, the cognitive analysis module 410 and the display module 420 disable the display of the roadside objects 220. At step 520 in the peripheral areas of the vehicle so that the driver can concentrate on the dangerous object laying directly in the vehicle's path of travel, as discussed above with regard to FIGS. 2-4. In addition, as discussed above, the display of the roadside objects 220 can be replaced, if desired, by a display of the object lying immediately ahead of the vehicle, preferably with a flashing indication and/or an audible alert.

At step 530, the object detection module 409 and the cognitive analysis module 410 utilize information from the external cameras 405 and the external sensors 407 to determine whether the dangerous object is still ahead of the vehicle 200, and if the rate of closure is still such that the object represents a danger of collision. If these conditions still exist, the cognitive analysis module 410 and the display module 420 will continue to disable the display of the roadside objects. However, once it is determined that the object directly ahead of the vehicle no longer represents a danger, the object detection module 409 will return to normal operation to detect roadside objects in the peripheral regions of the vehicle and the driver's view, to resume display of such roadside objects in the display areas 320 and 330 of the windshield 300.

Although the above description has been made in terms of a vehicle 200 on a roadway, noting that such vehicles include cars, trucks, motorcycles with windshields etc., the principles of the invention described above could be used with other vehicles, such as boats in the water or airplanes on the ground which are, at times, surrounded by other objects in their peripheral regions which could pose a risk or are of interest to the occupants.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method comprising:
 detecting, by a computer device, a roadside object in a vehicle driver's peripheral view;

analyzing, by the computer device, the roadside object to assign a level of importance to the roadside object based on predefined levels of importance;

displaying, by the computer device, the roadside object as a semi-transparent object in a display area of a windshield of the vehicle with an indication of the level of importance of the roadside object; and detecting, by the computer device, information regarding distance and time to reach the roadside object using sensors mounted on the vehicle.

2. The method of claim 1, wherein the roadside object is in at least one of a vehicle driver's mid peripheral view and far peripheral view, which is at least 30° or greater on either side of a centerline of the driver's view looking directly ahead of the vehicle, and the level of importance of the roadside object is provided by color coding of a portion of the displayed semi-transparent object.

3. The method of claim 2, wherein the display area is on a driver's side of the windshield within a near peripheral area of the driver's view, which is less than 30° on either side of the centerline of the driver's view looking directly ahead of the vehicle.

4. The method of claim 2, wherein the display area is within a paracentral display area of 4° on either side of a centerline of the driver's view.

5. The method of claim 4, wherein the display area is in a lower portion of the windshield.

6. The method of claim 4, wherein the display area is in an upper portion of the windshield.

7. The method of claim 1, wherein the predefined levels of importance are stored in a database as high severity objects, medium severity objects and low severity objects in accordance with expected amounts of damage and injury if the vehicle strikes the roadside object.

8. The method of claim 7, wherein the high severity objects are color-coded as a first color, the medium severity objects are color-coded as a second color and the low severity objects are color-coded with a third color.

9. The method of claim 1, wherein the roadside object is detected by a camera mounted on a side of the vehicle.

10. The method of claim 1, further comprising displaying, by the computer device, the information regarding distance and time to reach the roadside object in the display area adjacent the displayed semi-transparent object.

11. The method of claim 1, further comprising displaying, by the computer device, text identifying the roadside object adjacent the displayed semi-transparent object.

12. The method of claim 1, further comprising disabling, by the computer device, the display of the semi-transparent object in the display area if a high severity object is detected directly ahead of the vehicle which the vehicle will strike if it continues to move in the same direction.

13. A computer-based system for augmenting roadside content viewing in a moving vehicle comprising:

a processor, a computer readable memory, and a computer readable storage medium associated with a computer device;

program instructions to detect, via at least one of front and side cameras on the vehicle, an object of interest in a driver's mid and far peripheral view, which is 30° or greater on either side of a centerline of the driver's view looking directly ahead of the vehicle;

program instructions to analyze the object of interest, using image analytics, to determine a level of importance of the object of interest relative to predefined levels of importance; and program instructions to, if the analysis determines the object of interest exceeds a predetermined level of importance, color code the object in accordance with the determined level of importance and display the object of interest as a semi-transparent object in a display area of a windshield of the moving vehicle, wherein the program instructions are stored on the computer readable storage medium for execution by the CPU via the computer readable memory, and wherein the level of importance of the object of interest includes levels of severity regarding possible damage and injury if the moving vehicle strikes the object of interest.

14. The system of claim 13, wherein the level of importance is based upon a determination a level of interest of the driver based upon at least one of a biometric feedback from the driver and a historical analysis of the driver's interests and preferences.

15. The system of claim 13, wherein the display area is on a driver's-side of the windshield within a near peripheral area of the driver's view, which is less than 30° on either side of a centerline of the driver's view looking directly ahead of the moving vehicle.

16. The system of claim 15, wherein the display area is in a lower portion of the windshield.

17. The system of claim 13, further comprising program instructions to disable the display of the semi-transparent object in the display area if an object is detected directly ahead of the vehicle which the vehicle will strike if it continues to move in the same direction.

18. A computer program product comprising a non-transitory computer readable storage medium having program instructions embodied therewith, the program instructions executable by a computer device to cause the computer device to:

detect a roadside object in at least one of a vehicle driver's mid and/or far peripheral view, which is 30° or greater on either side of a centerline of the driver's view looking directly ahead of the vehicle;

analyze the roadside object to assign a level of severity to the roadside object based on predefined levels of severity;

display the roadside object as a semi-transparent object in a display area of a windshield of the vehicle with an indication of the level of severity of the roadside object; and detect information regarding distance and time to reach the roadside object using sensors mounted on the vehicle, wherein the indication of the level of severity of the roadside object is provided by color coding of a portion of the displayed semi-transparent object.

19. The computer program product of claim 18, wherein the predefined levels of severity are stored in a database as high severity objects, medium severity objects and low severity objects in accordance with expected amounts of damage and injury if the vehicle strikes the roadside object.

20. The computer program product of claim 19, wherein the high severity objects are color-coded as a first color, the medium severity objects are color-coded as a second color and the low severity objects are color-coded with a third color.

\* \* \* \* \*